US012784765B2

(12) United States Patent
Tanaka et al.

(10) Patent No.: US 12,784,765 B2
(45) Date of Patent: Nov. 3, 2026

(54) INFORMATION PROCESSING METHOD, INFORMATION PROCESSING DEVICE, AND RECORDING MEDIUM

(71) Applicant: Panasonic Intellectual Property Corporation of America, Torrance, CA (US)

(72) Inventors: Minami Tanaka, Tokyo (JP); Atsushi Sakaguchi, Kyoto (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 280 days.

(21) Appl. No.: 18/396,232

(22) Filed: Dec. 26, 2023

(65) Prior Publication Data

US 2024/0135952 A1 Apr. 25, 2024

Related U.S. Application Data

(63) Continuation of application No. PCT/JP2022/018124, filed on Apr. 19, 2022.

(30) Foreign Application Priority Data

Jul. 9, 2021 (JP) ................................ 2021-114293

(51) Int. Cl.
*G10L 25/03* (2013.01)

(52) U.S. Cl.
CPC .................................... *G10L 25/03* (2013.01)

(58) Field of Classification Search
CPC ..... G10L 25/03; G10L 21/0364; G10L 25/51; H04R 3/12; H04R 1/1083; H04R 1/326; H04R 1/406; H04R 5/02; H04R 5/027; H04R 29/001; H04R 29/004; G10K 15/00; G10K 11/17861; G10K 15/063;
(Continued)

(56) References Cited

U.S. PATENT DOCUMENTS 7,643,640 B2 * 1/2010 Jorgensen .............. G06F 30/13
381/62
9,437,181 B2 * 9/2016 Fallat .................... H04R 3/005
(Continued)

FOREIGN PATENT DOCUMENTS

EP 2648425 10/2013
EP 2648425 A1 * 10/2013 ............ H04R 27/00
(Continued)

OTHER PUBLICATIONS

International Search Report (ISR) issued on Jun. 21, 2022 in International (PCT) Application No. PCT/JP2022/018124.

*Primary Examiner* — Gerald Gauthier
(74) *Attorney, Agent, or Firm* — Wenderoth, Lind & Ponack, L.L.P.

(57) ABSTRACT

An information processing method includes: obtaining a target distribution indicating a target for sound pressure distribution in a space; obtaining an initial value of a parameter value, the parameter value being a value of an acoustic parameter of the space; executing acoustic simulation using the initial value as the parameter value, to obtain the sound pressure distribution in the space; updating the parameter value to bring the sound pressure distribution obtained closer to the target distribution; and outputting the parameter value updated.

15 Claims, 11 Drawing Sheets

(58) Field of Classification Search
CPC ............ G10K 15/22; G01H 3/14; G01H 7/00; G01M 17/007; G06F 30/13; G10H 1/36; H03G 3/02
See application file for complete search history.

(56) References Cited

U.S. PATENT DOCUMENTS

| | | | | |
|---|---|---|---|---|
| 10,789,949 | B2 * | 9/2020 | Carreras | G10L 15/22 |
| 10,848,891 | B2 * | 11/2020 | Khaleghimeybodi | H04R 5/027 |
| 10,867,619 | B1 * | 12/2020 | Kuster | G10L 25/03 |
| 11,246,002 | B1 * | 2/2022 | Donley | H04R 1/406 |
| 2004/0187672 | A1 * | 9/2004 | Ito | G10K 15/12 84/626 |
| 2005/0207582 | A1 * | 9/2005 | Asada | G10H 1/26 381/98 |
| 2006/0078130 | A1 * | 4/2006 | Jorgensen | H04R 27/00 381/63 |
| 2007/0112563 | A1 * | 5/2007 | Krantz | H04R 5/02 704/216 |
| 2009/0296945 | A1 * | 12/2009 | Attia | G01M 17/007 381/56 |
| 2010/0303248 | A1 * | 12/2010 | Tawada | G01H 7/00 381/56 |
| 2011/0249825 | A1 * | 10/2011 | Ise | H04R 3/005 381/56 |
| 2012/0016640 | A1 * | 1/2012 | Murphy | G10K 15/02 703/2 |
| 2015/0077434 | A1 | 3/2015 | Fukuchi et al. | |
| 2016/0100269 | A1 * | 4/2016 | Seo | H04R 3/12 381/17 |
| 2018/0033424 | A1 * | 2/2018 | Pechanec | G10L 21/0364 |
| 2018/0233158 | A1 * | 8/2018 | Ray | G10L 21/0208 |
| 2018/0332382 | A1 * | 11/2018 | Boesen | G10K 11/17861 |
| 2018/0336902 | A1 * | 11/2018 | Cartwright | G06F 16/61 |
| 2019/0028824 | A1 * | 1/2019 | Freeman | H04R 29/001 |
| 2020/0015025 | A1 * | 1/2020 | Goldstein | G01H 3/14 |
| 2020/0051584 | A1 * | 2/2020 | Washio | G10L 25/51 |
| 2020/0077214 | A1 * | 3/2020 | Yuzuriha | H04R 1/406 |
| 2020/0162819 | A1 * | 5/2020 | Inoue | H04R 3/12 |
| 2021/0014624 | A1 * | 1/2021 | Hook | H04R 1/326 |
| 2021/0264936 | A1 * | 8/2021 | Miyamoto | G10L 15/063 |
| 2021/0280184 | A1 * | 9/2021 | Sekine | H04R 29/004 |
| 2021/0384879 | A1 * | 12/2021 | Fueki | H03G 3/02 |
| 2022/0053260 | A1 * | 2/2022 | Ku | H04R 1/1083 |
| 2024/0135952 | A1 * | 4/2024 | Tanaka | G10K 15/00 |

FOREIGN PATENT DOCUMENTS

| | | | |
|---|---|---|---|
| JP | 2002-123262 | | 4/2002 |
| JP | 2006-119640 | | 5/2006 |
| JP | 3926668 | B2 * | 6/2007 |
| JP | 2013-225245 | | 10/2013 |
| JP | 2014-2645 | | 1/2014 |
| JP | 2017-3306 | | 1/2017 |
| JP | 2020-197842 | | 12/2020 |

* cited by examiner

INFORMATION PROCESSING METHOD, INFORMATION PROCESSING DEVICE, AND RECORDING MEDIUM

CROSS REFERENCE TO RELATED APPLICATIONS

This is a continuation application of PCT International Application No. PCT/JP2022/018124 filed on Apr. 19, 2022, designating the United States of America, which is based on and claims priority of Japanese Patent Application No. 2021-114293 filed on Jul. 9, 2021. The entire disclosures of the above-identified applications, including the specifications, drawings and claims are incorporated herein by reference in their entirety.

FIELD

The present disclosure relates to an information processing method, an information processing device, and a recording medium.

BACKGROUND

There is a technique of simulating a sound field based on an acoustic parameter that is inputted in dialogue form (Patent Literature (PTL) 1).

CITATION LIST

Patent Literature

PTL 1: Japanese Unexamined Patent Application Publication No. 2002-123262

SUMMARY

Technical Problem

With regard to sound field simulation, there is the difficulty that an acoustic parameter cannot be appropriately determined.

In view of this, the present disclosure provides an information processing method, and so on, that can appropriately determine acoustic parameters.

Solution to Problem

An information processing method according to an aspect of the present disclosure includes: obtaining a target distribution indicating a target for sound pressure distribution in a space; obtaining an initial value of a parameter value, the parameter value being a value of an acoustic parameter of the space; executing acoustic simulation using the initial value as the parameter value, to obtain the sound pressure distribution in the space; updating the parameter value to bring the sound pressure distribution obtained closer to the target distribution; and outputting the parameter value updated.

Note that these generic or specific aspects may be implemented as a system, an apparatus, an integrated circuit, a computer program, or a computer-readable recording medium such as a CD-ROM, or may be implemented as any combination of a system, an apparatus, an integrated circuit, a computer program, and a recording medium.

Advantageous Effects

An information processing method, and so on, according to the present disclosure can appropriately determine an acoustic parameter.

BRIEF DESCRIPTION OF DRAWINGS

These and other advantages and features will become apparent from the following description thereof taken in conjunction with the accompanying Drawings, by way of non-limiting examples of embodiments disclosed herein.

Figure 1:
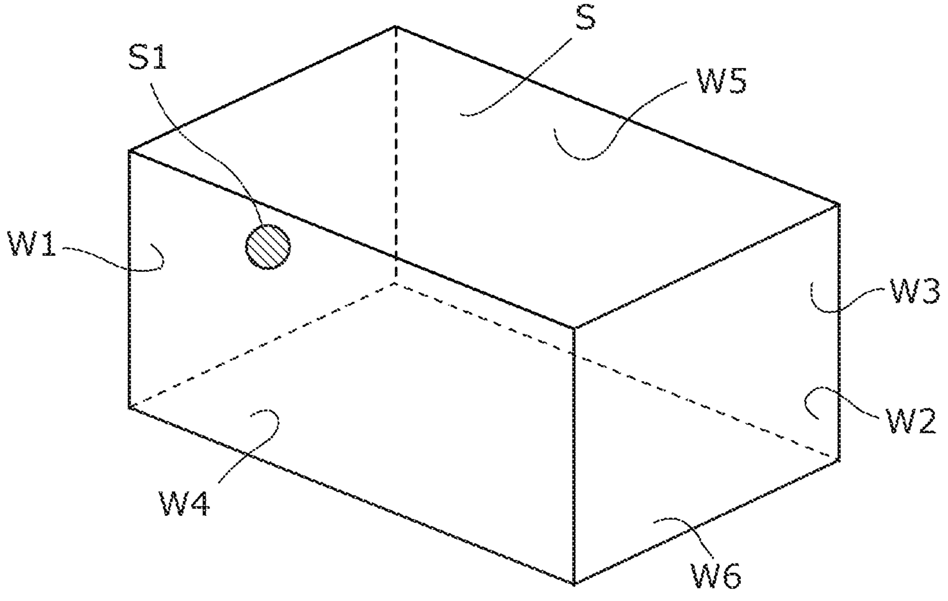
FIG. 1 is a schematic diagram illustrating a space for which a parameter value is to be determined in an embodiment.

DESCRIPTION OF EMBODIMENTS (Underlying Knowledge Forming Basis of the Present Disclosure)

The inventors have found that the following problem arises with regard to techniques for simulation regarding acoustics.

Generally, when designing acoustic parameters for concert halls, theaters, and the like, acoustic simulation is executed using manually determined acoustic parameters, and adjustment of the acoustic parameters is manually performed to obtain a desired sound pressure distribution, in some cases. In a case where the adjustment of acoustic parameters is performed manually, it is possible that a suitable acoustic parameter will not be obtained. Further, a great deal of time can be required until acoustic parameters that are considered suitable are obtained.

In this manner, there is the problem that an acoustic parameter cannot be appropriately determined when using acoustic simulation.

In order to solve such a problem, an information processing method according to an aspect of the present disclosure includes: obtaining a target distribution indicating a target for sound pressure distribution in a space; obtaining an initial value of a parameter value, the parameter value being a value of an acoustic parameter of the space; executing acoustic simulation using the initial value as the parameter value, to obtain the sound pressure distribution in the space; updating the parameter value to bring the sound pressure distribution obtained closer to the target distribution; and outputting the parameter value updated.

According to the above-described aspect, since the parameter value is updated to bring a sound pressure distribution obtained by acoustic simulation close to a target distribution, it is possible to output an appropriate acoustic parameter that can realize the target distribution or a sound pressure distribution that is relatively close to the target distribution. In this manner, the information processing method according to an aspect of the present disclosure can determine an appropriate acoustic parameter.

For example, the updating of the parameter value may include: executing the acoustic simulation using the parameter value updated, to obtain a new sound pressure distribution in the space; and determining whether the new sound pressure distribution obtained satisfies a predetermined condition indicating whether the sound pressure distribution is closer to the target distribution. For example, in the outputting of the parameter value updated, the parameter value updated may be outputted when it is determined that the new sound pressure distribution satisfies the predetermined condition.

According to the above-described aspect, since a parameter value is outputted when a new sound pressure distribution obtained by executing acoustic simulation has been brought close to a target distribution, it is guaranteed that the outputted parameter value is a parameter value such that a sound pressure distribution obtained by acoustic simulation using the parameter value is relatively close to the target distribution. In other words it can be said that the outputted parameter value is a parameter value that can realize the target distribution or a sound pressure distribution which is relatively close to the target distribution. Hence, the information processing method according to one aspect of the present disclosure can more appropriately determine an acoustic parameter.

For example, in the updating of the parameter value, satisfaction of at least one of the following may be used as the predetermined condition: (a) that a value of a function indicating a difference between the new sound pressure distribution and the target distribution, for the parameter value, is smaller than a specified value; (b) that a slope, in a vicinity of the parameter value, of the function indicating a difference between the new sound pressure distribution and the target distribution is smaller than a specified value; (c) that an average of absolute values of differences of respective variables of the new sound pressure distribution and the target distribution is smaller than or equal to a specified value, and differences between the respective variables fall within a specified range; and (d) a total number of executions of the acoustic simulation is greater than or equal to a specified value.

According to the above-described aspect, whether a new sound pressure distribution obtained by executing acoustic simulation is relatively close to a target distribution is determined using a specific condition. Hence, the information processing method according to one aspect of the present disclosure can more easily and more appropriately determine an acoustic parameter.

For example, the difference between the new sound pressure distribution and the target distribution may be a root-mean-square error between the sound pressure distribution and the target distribution.

According to the above-described aspect, since the difference between a sound pressure distribution obtained by executing acoustic simulation and a target distribution is obtained using a root-mean-square error, it becomes easier to determine an acoustic parameter. Hence, the information processing method according to one aspect of the present disclosure can more easily and more appropriately determine an acoustic parameter.

For example, in the updating of the parameter value, the parameter value may be updated by using steepest descent method, Newton method, or Bayesian optimization.

According to the above-described aspect, since updating of a parameter value is performed using the steepest descent method, the Newton method, or Bayesian optimization, it becomes easier to update a parameter value. Hence, the information processing method according to one aspect of the present disclosure can more easily and more appropriately determine an acoustic parameter.

For example, the acoustic simulation may be implemented according to finite element method, sound ray-tracing method, or image source method.

According to the above-described aspect, since acoustic simulation is performed using a finite element method, sound ray-tracing method, or image source method, it becomes easier to execute acoustic simulation. Hence, the information processing method according to one aspect of the present disclosure can more easily and more appropriately determine an acoustic parameter.

For example, the acoustic parameter may include includes: a sound absorption coefficient of a wall that makes up the space, a shape of the space, a position of a loudspeaker disposed inside the space, an amplitude or phase of a sound outputted by a loudspeaker disposed in the space, or a position of an object disposed inside the space.

According to the above-described aspect, a sound absorption coefficient of a wall that makes up a space, a shape of the space, a position of a loudspeaker disposed inside the space, an amplitude or a phase of a sound outputted by a loudspeaker disposed inside the space, or a position of an object disposed inside the space can be appropriately determined as an acoustic parameter.

For example, the acoustic parameter may be a sound absorption coefficient of a plurality of walls that make up the space, and in the updating of the parameter value, the parameter value may be updated by setting a same value as a sound absorption coefficient of two or more of the plurality of walls.

According to the above-described aspect, since the same sound absorption coefficient is set for two or more walls among a plurality of walls that make up the space, the amount of calculation in the processing for updating the sound absorption coefficients can be reduced, which can reduce the processing load and contribute to reducing the power consumption. Hence, the information processing method according to one aspect of the present disclosure can appropriately determine an acoustic parameter while contributing to power saving.

For example, the target distribution may be a sound pressure distribution actually measured in the space.

According to the above-described aspect, by using a sound pressure distribution that is actually measured in the space as the target distribution, an acoustic parameter realizing the space can be determined and outputted. Hence, the information processing method according to one aspect of the present disclosure can appropriately determine an acoustic parameter realizing a space that actually exists.

For example, the target distribution may be a desired sound pressure distribution for the space.

According to the above-described aspect, by using a sound pressure distribution that is actually measured in a space for which a parameter value is unknown as the target distribution, the parameter value in the space can be determined and outputted. Hence, the information processing method according to one aspect of the present disclosure can appropriately determine an acoustic parameter realizing a space that actually exists.

Furthermore, an information processing method according to an aspect of the present disclosure includes: obtaining a parameter value that is a value of an acoustic parameter of a space; executing acoustic simulation using the parameter value, to obtain a first sound pressure distribution inside a first region in the space and a second sound pressure distribution inside a second region in the space; updating the parameter value to increase a difference between the first sound pressure distribution and the second sound pressure distribution; and outputting the parameter value updated.

According to the above-described aspect, since a parameter value is updated so as to increase a difference between sound pressure distributions in two regions obtained by executing acoustic simulation, an appropriate acoustic parameter which can realize the above-described two regions having a relatively large difference between the respective sound pressure distributions thereof can be determined and outputted. In this manner, the information processing method according to one aspect of the present disclosure can appropriately determine an acoustic parameter.

For example, the updating of the parameter value may include: executing the acoustic simulation using the parameter value updated, to obtain a new first sound pressure distribution and a new second sound pressure distribution in the space; and determining whether the new first sound pressure distribution and the new second sound pressure distribution obtained satisfy a predetermined condition indicating whether the difference between the first sound pressure distribution and the second sound pressure distribution has increased. For example, in the outputting of the parameter value updated, the parameter value updated may be outputted when it is determined that the new first sound pressure distribution and the new second sound pressure distribution satisfy the predetermined condition.

According to the above-described aspect, since a parameter value is outputted when a difference between a new first sound pressure distribution and a new second sound pressure distribution obtained by executing acoustic simulation is relatively large, it is guaranteed that the outputted parameter value is a parameter value such that a difference between a first sound pressure distribution and a second sound pressure distribution that are obtained by acoustic simulation using the parameter value is relatively large. In other words, it can be said that the outputted parameter value is a parameter value that can realize a first sound pressure distribution and a second sound pressure distribution which have a relatively large difference therebetween. Hence, the information processing method according to one aspect of the present disclosure can more appropriately determine an acoustic parameter.

For example, in the updating of the parameter value, satisfaction of at least one of the following may be used as the predetermined condition: (a) that a slope, in a vicinity of the parameter value, of a function indicating the difference between the new first sound pressure distribution and the new second sound pressure distribution is smaller than a specified value; (b) that the difference between the new first sound pressure distribution and the new second sound pressure distribution is bigger than or equal to a specified value; and (c) a total number of executions of the acoustic simulation is greater than or equal to a specified value.

According to the above-described aspect, whether a difference between a new first sound pressure distribution and a new second sound pressure distribution that are obtained by executing acoustic simulation is relatively large is determined using a specific condition. Hence, the information processing method according to one aspect of the present disclosure can more easily and more appropriately determine an acoustic parameter.

An information processing device according to an aspect of the present disclosure includes: an obtainer; a calculator; and an outputter. The obtainer obtains a target distribution indicating a target for sound pressure distribution in a space, and obtains an initial value of a parameter value, the parameter value being a value of an acoustic parameter of the space. The calculator executes acoustic simulation using the initial value as the parameter value, to obtain the sound pressure distribution in the space, and updates the parameter value to bring the sound pressure distribution obtained closer to the target distribution. The outputter outputs the parameter value updated.

According to the above-described aspect, the same advantageous effect as in the above-described information processing method can be produced.

An information processing device according to an aspect of the present disclosure includes: an obtainer; a calculator; and an outputter. The obtainer obtains a parameter value that is a value of an acoustic parameter of a space. The calculator executes acoustic simulation using the parameter value, to obtain a first sound pressure distribution inside a first region in the space and a second sound pressure distribution inside a second region in the space, and updates the parameter value to increase a difference between the first sound pressure distribution and the second sound pressure distribution. The outputter outputs the parameter value updated.

According to the above-described aspect, the same advantageous effect as in the above-described information processing method can be produced.

Furthermore, a recording medium according to an aspect of the present disclosure is a non-transitory computer-readable recording medium having recorded thereon a program for causing a computer to execute the information processing method describe above.

According to the above-described aspect, the same advantageous effect as in the above-described information processing method can be produced.

Note that these generic or specific aspects may be implemented as a system, an apparatus, an integrated circuit, a computer program, or a computer-readable recording medium such as a CD-ROM, or may be implemented as any combination of a system, an apparatus, an integrated circuit, a computer program, and a recording medium.

Hereinafter exemplary embodiments will be specifically described with reference to the Drawings.

Note that each of the following embodiments shows a generic or specific example of the present disclosure. The numerical values, shapes, materials, structural components, the arrangement and connection of the structural components, steps, the processing order of the steps, etc., shown in the following embodiments are mere examples, and thus are not intended to limit the present disclosure. Furthermore, among the structural components described in the following embodiments, structural components not recited in any one of the independent claims that indicate the broadest concepts are described as optional structural components.

Embodiment

In the present embodiment, an information processing method and an information processing device which can appropriately determine an acoustic parameter and so on are described.

As one example, in a case where an acoustic parameter of an existing space is unknown, the information processing device of the present embodiment can be used for the purpose of estimating the value of an acoustic parameter (also referred to as "parameter value") which the space has based on a sound pressure distribution which was actually measured in the space.

Here, the term "acoustic parameter" refers to a parameter relating to the propagation or distribution of sound in a space, and can include one or more acoustic parameters. Acoustic parameters include a sound absorption coefficient of a wall that makes up a space, the shape of the space, the position of a loudspeaker disposed inside the space, the amplitude or the phase of a sound outputted by a loudspeaker disposed inside the space, and the position of an object disposed inside the space. Acoustic parameters estimated by the above-described information processing device may be some or all of the acoustic parameters which the space has.

Hereinafter, a case where the information processing device estimates a sound absorption coefficient that is one of the acoustic parameters that the space has is described as an example. In this case, it is assumed that acoustic parameters (for example, the shape of the space, the position of a loudspeaker, and so on) other than the above-described one acoustic parameter, that is, the sound absorption coefficient, among the acoustic parameters which the space has are already determined and are not changed. In other words, the acoustic parameters other than the above-described one acoustic parameter, that is, the sound absorption coefficient, among the acoustic parameters which the space has are fixed in the processing for estimating the above-described one acoustic parameter, that is, the sound absorption coefficient.

FIG. 1 is a schematic diagram illustrating space S for which a parameter value is to be determined in the present embodiment. A perspective view of space S is illustrated in FIG. 1.

As one example, space S illustrated in FIG. 1 is a space that has a rectangular parallelepiped shape. Note that, the shape of space S for which a parameter value is to be determined by the information processing device in the present embodiment is not limited to a rectangular parallelepiped shape, and may be a cylindrical shape whose base is a polygon or any figure surrounded by straight lines and curves, or may be various shapes such as a sphere.

Space S has walls W1, W2, W3, W4, W5, and W6 (also referred to as walls W1 to W6). Walls W1 to W6 function as partitions which separate space S from the outside of space S. The respective sound absorption coefficients of walls W1 to W6 differ depending on the material forming the wall, the thickness of the wall, and so on. The respective sound absorption coefficients of walls W1 to W6 are objects to be estimated by the information processing device.

Loudspeaker S1 is disposed inside space S. Sound that loudspeaker S1 outputs propagates through space S while being absorbed or reflected by walls W1 to W6. The sound that loudspeaker S1 outputs propagates within space S and a sound pressure distribution is generated.

Figure 2:
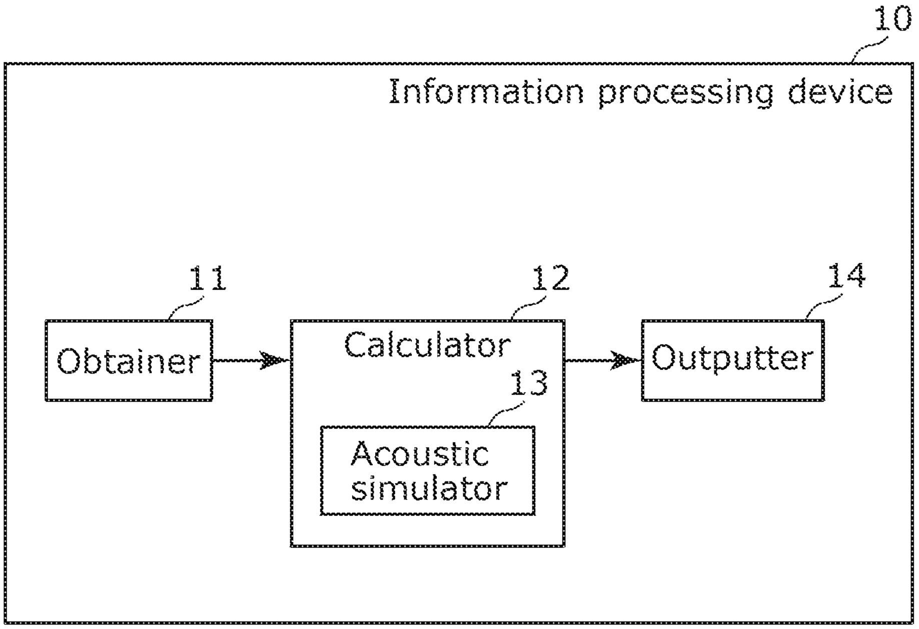
FIG. 2 is a block diagram illustrating functions of an information processing device in the embodiment.

FIG. 2 is a block diagram illustrating functions of information processing device 10 in the present embodiment.

As illustrated in FIG. 2, information processing device 10 includes obtainer 11, calculator 12, and outputter 14 as functional parts. The functional parts that information processing device 10 includes can be realized by a processor (for example, a central processing unit) (not illustrated) that information processing device 10 includes executing a predetermined program using a memory (not illustrated).

Obtainer 11 is a functional part that obtains information necessary for determination of a parameter value by information processing device 10. Specifically, obtainer 11 obtains a target distribution indicating a target for the sound pressure distribution in space S. The target distribution is a sound pressure distribution which was actually measured in the space S. The target distribution is a sound pressure distribution that is an object to which a sound pressure distribution that calculator 12 calculates is brought closer during processing for estimating an acoustic parameter by information processing device 10.

Further, obtainer 11 obtains acoustic parameters in space S. Acoustic parameters which obtainer 11 obtains include an initial value of an unknown acoustic parameter and parameter values of known acoustic parameters. Here, an unknown acoustic parameter is a sound absorption coefficient, and known acoustic parameters are the shape of the space, the position of a loudspeaker, and so on.

Initial values of sound absorption coefficients which obtainer 11 obtains are used as parameter values when calculator 12 first executes acoustic simulation (described later), as the respective sound absorption coefficients of walls W1 to W6. The initial value may be any value, for example, a value calculated assuming that the value has a certain degree of validity based on the shape of space S, the material of the wall, and so on, or may be a random value. Note that, when the initial value is a value that is relatively close to the parameter value which information processing device 10 ultimately outputs, there is a possibility that the parameter value which information processing device 10 outputs will be more appropriate.

Calculator 12 is a functional part that obtains a sound pressure distribution in space S by calculation by executing acoustic simulation. Calculator 12 has acoustic simulator 13, and executes acoustic simulation using acoustic simulator 13. Various methods such as a finite element method, a sound ray-tracing method, or an image source method can be adopted as the method of acoustic simulation used by acoustic simulator 13.

Specifically, calculator 12 obtains the sound pressure distribution in space S by executing acoustic simulation using sound absorption coefficients that are acoustic parameters which obtainer 11 obtained. Further, calculator 12 updates the sound absorption coefficients so as to bring the obtained sound pressure distribution closer to the target distribution. When updating the sound absorption coefficients, calculator 12 obtains a new sound pressure distribution in space S by executing acoustic simulation using the updated sound absorption coefficients, and may determine whether or not the obtained new sound pressure distribution satisfies a condition which was determined in advance as a condition indicating that the obtained new sound pressure distribution has been brought close to the target distribution.

Updating of the acoustic parameters can be carried out by optimization processing in which the acoustic parameters are taken as the optimization variables. Various methods such as the steepest descent method, the Newton method, or Bayesian optimization can be adopted as the optimization processing method.

Note that, the updating of acoustic parameters which calculator 12 performs is carried out with a directionality such that, as a result, a sound pressure distribution calculated based on the acoustic parameters is brought closer to the target distribution, and it can also be said that the processing obtains parameters by solving an inverse problem from a target. In this sense, the processing relating to updating of acoustic parameters which calculator 12 performs is also referred to as "inverse analysis".

Outputter 14 is a functional part that outputs the sound absorption coefficients which are acoustic parameters. Outputter 14 outputs the sound absorption coefficients updated by calculator 12. More specifically, when it is determined that a new sound pressure distribution calculated by calculator 12 satisfies a predetermined condition, outputter 14 may output the updated sound absorption coefficients.

Hereinafter, processing which information processing device 10 executes is described. The processing which information processing device 10 executes is also referred to as an "information processing method".

Figure 3:
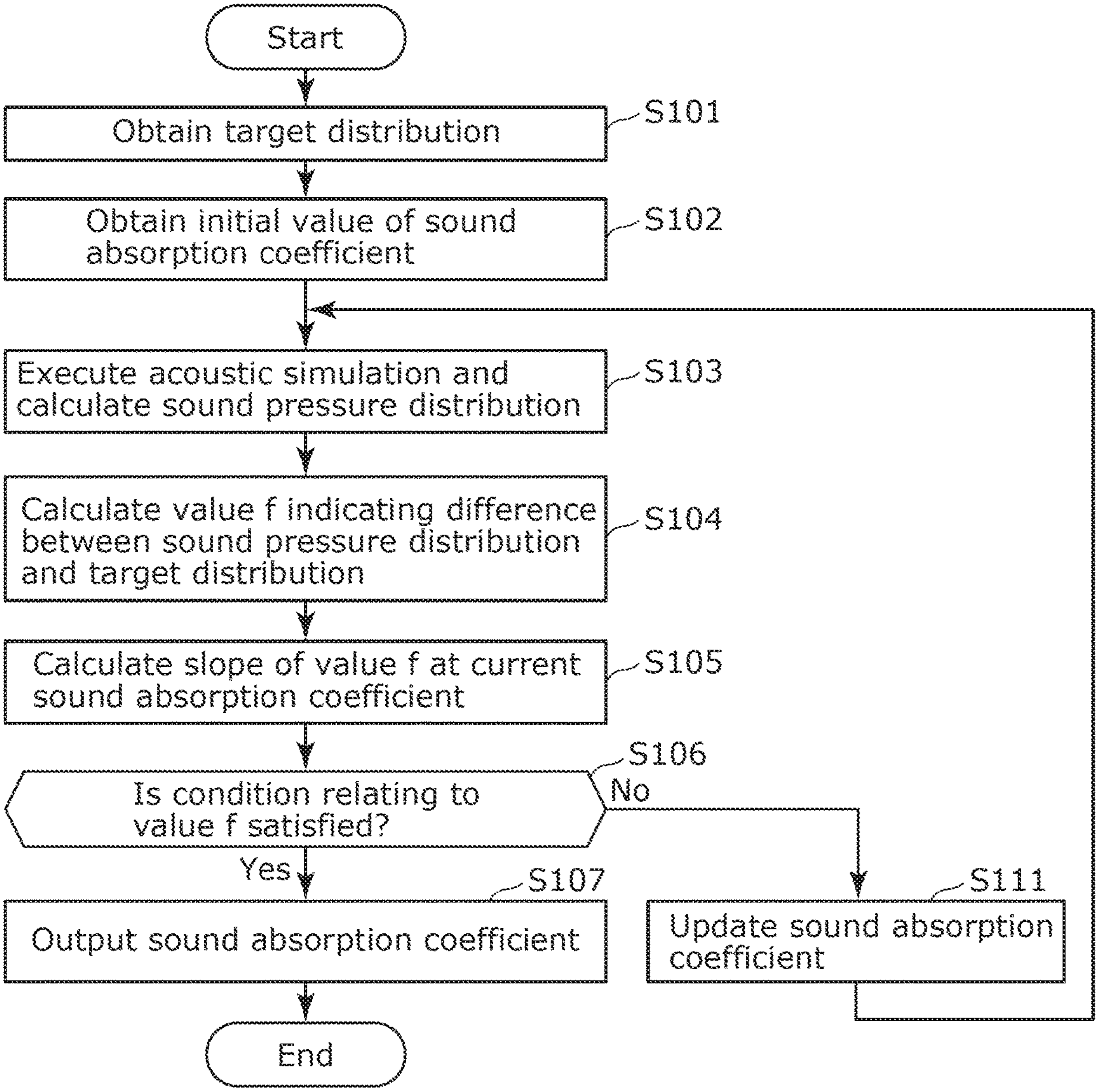
FIG. 3 is a flowchart illustrating a first example of an information processing method in the embodiment.
Figure 4:
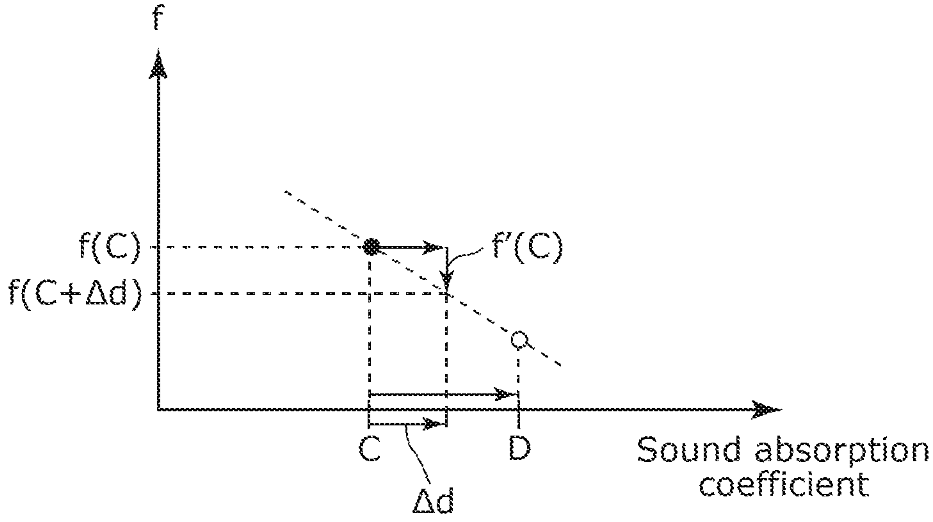
FIG. 4 is an explanatory diagram illustrating the calculation of a slope in the embodiment.

FIG. 3 is a flowchart illustrating a first example of an information processing method in the present embodiment. FIG. 4 is an explanatory diagram illustrating the calculation of a slope in the embodiment. The information processing method which information processing device 10 executes will be described while referring to FIG. 3 and FIG. 4.

Note that, here, processing in the case of updating acoustic parameters (that is, sound absorption coefficients) using optimization processing according to the steepest descent method is described.

As illustrated in FIG. 3, in step S101, obtainer 11 obtains a target distribution. Obtainer 11 obtains the target distribution by receiving a target distribution inputted by a user, or by obtaining, via a communication line, information indicating the target distribution which is stored in a device external to information processing device 10.

In step S102, obtainer 11 obtains initial values of the respective sound absorption coefficients of walls W1 to W6. Obtainer 11 obtains the above-described initial values of sound absorption coefficients by receiving the above-described initial values of sound absorption coefficients inputted by a user, or by obtaining, via a communication line, information indicating the above-described initial values of sound absorption coefficients which is stored in a device external to information processing device 10.

In step S103, calculator 12 calculates a sound pressure distribution by executing acoustic simulation using acoustic simulator 13. Specifically, calculator 12 calculates a sound pressure distribution within space S when loudspeaker S1 outputs sound, by executing acoustic simulation using the initial values of sound absorption coefficients obtained in step S102. Note that, parameter values used in the acoustic simulation in step S103 are also referred to as parameter values corresponding to the sound pressure distribution calculated in step S103.

In step S104, calculator 12 calculates value (also referred to as "difference value") f showing the difference between the sound pressure distribution calculated in step S103 and the target distribution. Difference value f can be represented by a mathematical expression that has a larger value as the difference between the sound pressure distribution calculated in step S103 and the target distribution increases. As one example, difference value f is represented by a root-mean-square error (see (Equation 1)).

[Math. 1]

$$f = \sqrt{\frac{1}{n}\sum_{k=1}^{n}(Pm_k - Pa_k)^2} \quad \text{(Equation 1)}$$

In (Equation 1), n is the total number of elements in the target distribution or sound pressure distribution, $Pm_k$ is the sound pressure value of the $k^{th}$ element in the target distribution, and $Pa_k$ is the sound pressure value of the $k^{th}$ element in the sound pressure distribution calculated in step S103.

The sound absorption coefficient and difference value f will be described while referring to FIG. 4. The abscissa axis in FIG. 4 represents the sound absorption coefficient, and the axis of ordinates represents difference value f.

In FIG. 4, with respect to sound absorption coefficient C that was used in the acoustic simulation in step S103 executed immediately before the present step S104, difference value f(C) which is difference value f when the sound absorption coefficient is C is represented as a black circle.

In step S105, calculator 12 calculates slope f'(C) of difference value f at the time of the current sound absorption coefficient, that is, when the sound absorption coefficient is C (see FIG. 4). Note that, various methods can be adopted as a method for calculating slope f'(C). For example, difference value f(C+Δd) which is difference value f when C is changed by minute amount Δd is calculated, and slope f'(C) can be calculated by the following equation using difference value f(C+Δd) (see (Equation 2)).

$$f'(C) = (f(C+\Delta d) - f(C))/\Delta d \quad \text{(Equation 2)}$$

Further, in a case where difference value f is given as a function of the sound absorption coefficient, slope f'(C) can also be calculated using derivative f' obtained by differentiating function f with respect to the sound absorption coefficient.

In step S106, calculator 12 determines whether or not a predetermined condition relating to difference value f is satisfied. If calculator 12 determines that the predetermined condition is satisfied (Yes in step S106), the process proceeds to step S107, otherwise (No in step S106) the process proceeds to step S111. The predetermined condition is a condition which is prescribed in advance as a condition indicating that the new sound pressure distribution obtained by executing the acoustic simulation has been brought close to the target distribution.

More specifically, the predetermined condition is that at least one of the following is satisfied: (a) that, for a parameter value corresponding to the new sound pressure distribution, a value of a function indicating a difference between the new sound pressure distribution and the target distribution is smaller than a specified value; (b) that a slope in the vicinity of the parameter value corresponding to the new sound pressure distribution, of the function indicating a difference between the new sound pressure distribution and the target distribution is smaller than a specified value; (c) that an average of absolute values of differences of respective variables of the new sound pressure distribution and the target distribution is smaller than or equal to a specified value, and differences between the respective variables fall within a specified range; and (d) that a total number of executions of the acoustic simulation is greater than or equal to a specified value.

Here, the specified value in the above-described (a) can be set to, for example, 10% of the difference between the target distribution and the sound pressure distribution obtained using the initial value of the parameter value. The specified value in the above-described (b) can be set to, for example, 10% of the slope of the sound pressure distribution obtained using the initial value of the parameter value. The specified value relating to the average of absolute values of differences in the above-described (c) can be set to, for example 10% of the difference between the latest sound pressure distribution and the target distribution, and the specified range relating to the difference can be set to a range of plus and minus 10% including the difference between the latest sound pressure distribution and the target distribution. The specified value relating to the total number of executions in the above-described (d) can be set to, for example, 10 to 100 times.

Note that, the specified value relating to the average of absolute values of differences in the above-described (c) can also be set to a value (for example, 3 dB) corresponding to the lowest level of a difference that can be discriminated by humans. In such case, the specified range relating to the difference in the above-described (c) can be set to a range having a width that is approximately equal to the above-described specified value (for example, a range of plus and minus 1 to 1.5 dB) which is centered on the specified value.

In step S111, calculator 12 updates the sound absorption coefficient. Specifically, calculator 12 updates the sound absorption coefficient by calculating new sound absorption coefficient D from sound absorption coefficient C according to the following (Equation 3). New sound absorption coefficient D is shown as a white circle in FIG. 4. Note that, μ is a learning rate, and is a value that corresponds to a change width in updating of the sound absorption coefficient, and can be set within a range of greater than 0 to less than 1.

$$D = C - \mu \times f'(C) \times \Delta d \qquad \text{(Equation 3)}$$

In step S107, outputter 14 outputs a sound absorption coefficient. The sound absorption coefficient that is outputted is a sound absorption coefficient obtained by the updating in step S111 performed with respect to the sound absorption coefficient obtained in step S102. Note that, if it is determined that difference value f satisfies the condition (Yes in step S106) when step S106 is executed for the first time, the sound absorption coefficient obtained in step S102 is outputted as it is. After completing step S107, the series of processing illustrated in FIG. 3 is ended.

Note that the Newton method can also be adopted as a method for performing optimization processing of the acoustic parameter, that is, the sound absorption coefficient. In such case, when updating the sound absorption coefficient in step S111, the sound absorption coefficient is updated by approximating difference value f to a quadratic polynomial of the sound absorption coefficient, and calculating the acoustic parameter so as to bring it closer to the optimal solution of the quadratic polynomial. The processing other than step S111 in FIG. 3 is the same as the processing in the steepest descent method.

By this means, information processing device 10 can appropriately estimate a sound absorption coefficient that is an unknown acoustic parameter, and output the sound absorption coefficient.

Figure 5:
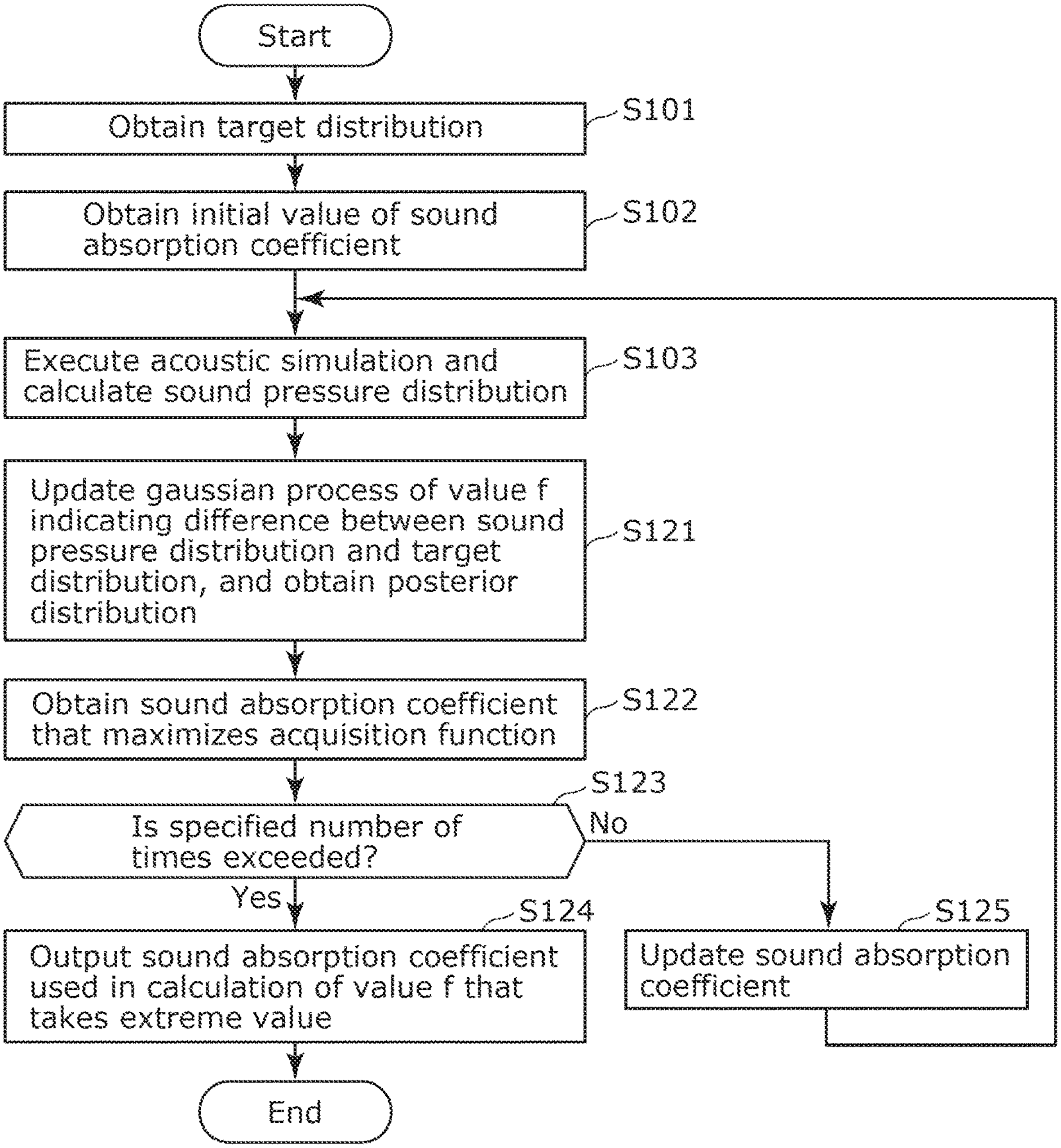
FIG. 5 is a flowchart illustrating a second example of an information processing method in the embodiment.

FIG. 5 is a flowchart illustrating a second example of an information processing method in the present embodiment. The information processing method which information processing device 10 executes will be described while referring to FIG. 5.

Note that, here, processing in the case of updating an acoustic parameter (that is, a sound absorption coefficient) using optimization processing according to Bayesian optimization is described.

The processing in step S101 to step S103 is the same as the processing in the steps of the same names in FIG. 3.

In step S121, calculator 12 updates the Gaussian process of difference value f indicating the difference between the sound pressure distribution calculated in step S103 and the target distribution obtained in step S101, and obtains the posterior distribution.

In step S122, calculator 12 obtains the sound absorption coefficient that maximizes the acquisition function.

In step S123, calculator 12 determines whether or not the number of times a sound absorption coefficient was obtained in step S122 exceeds a specified number of times. If calculator 12 determines that the specified number of times is exceeded (Yes in step S123), the process proceeds to step S124, otherwise (No in step S123) the process proceeds to step S125.

In step S125, calculator 12 updates the sound absorption coefficient. Specifically, calculator 12 updates the sound absorption coefficient by calculating a sound absorption coefficient that maximizes the acquisition function obtained in step S122.

In step S124, outputter 14 outputs a sound absorption coefficient. The sound absorption coefficient outputted in step S124 is a sound absorption coefficient used in the calculation of difference value f that takes the extreme value among difference values f which were calculated in the series of processing up to this point. After completing step S124, the series of processing illustrated in FIG. 5 is ended.

By this means, information processing device 10 can appropriately estimate a sound absorption coefficient that is an unknown acoustic parameter, and output the sound absorption coefficient.

Hereinafter, sound absorption coefficients that are updated will be described while referring to specific examples of a target distribution and a sound absorption coefficient.

Figure 6:
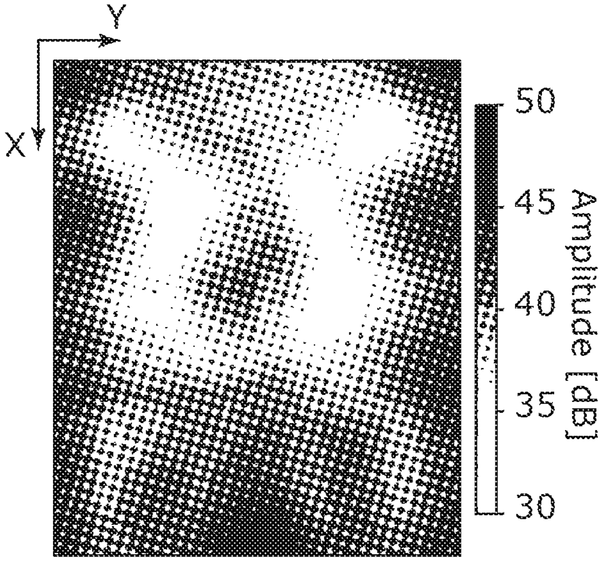
FIG. 6 is an explanatory diagram illustrating an example of target distribution in the embodiment.

FIG. 6 is an explanatory diagram illustrating an example of a target distribution in the present embodiment.

The target distribution illustrated in FIG. 6 indicates the target value of the sound pressure distribution on an XY plane having one Z value in space S illustrated in FIG. 1. The right direction on the paper surface is the Y-axis positive direction, and the downward direction on the paper surface is the X-axis positive direction.

The sound pressure distribution is indicated by amplitude [dB], and the closer the color is to black, the higher the amplitude is (that is, the higher the sound pressure is).

The target distribution illustrated in FIG. 6 illustrates a sound pressure distribution in which the sound pressure is relatively high at the outer peripheral part of space S, that is, near the walls, and the sound pressure is relatively low at the central part of space S. Note that, in the target distribution illustrated in FIG. 6, even at the central part of space S, there are some positions where the sound pressure is relatively high.

Figure 7:
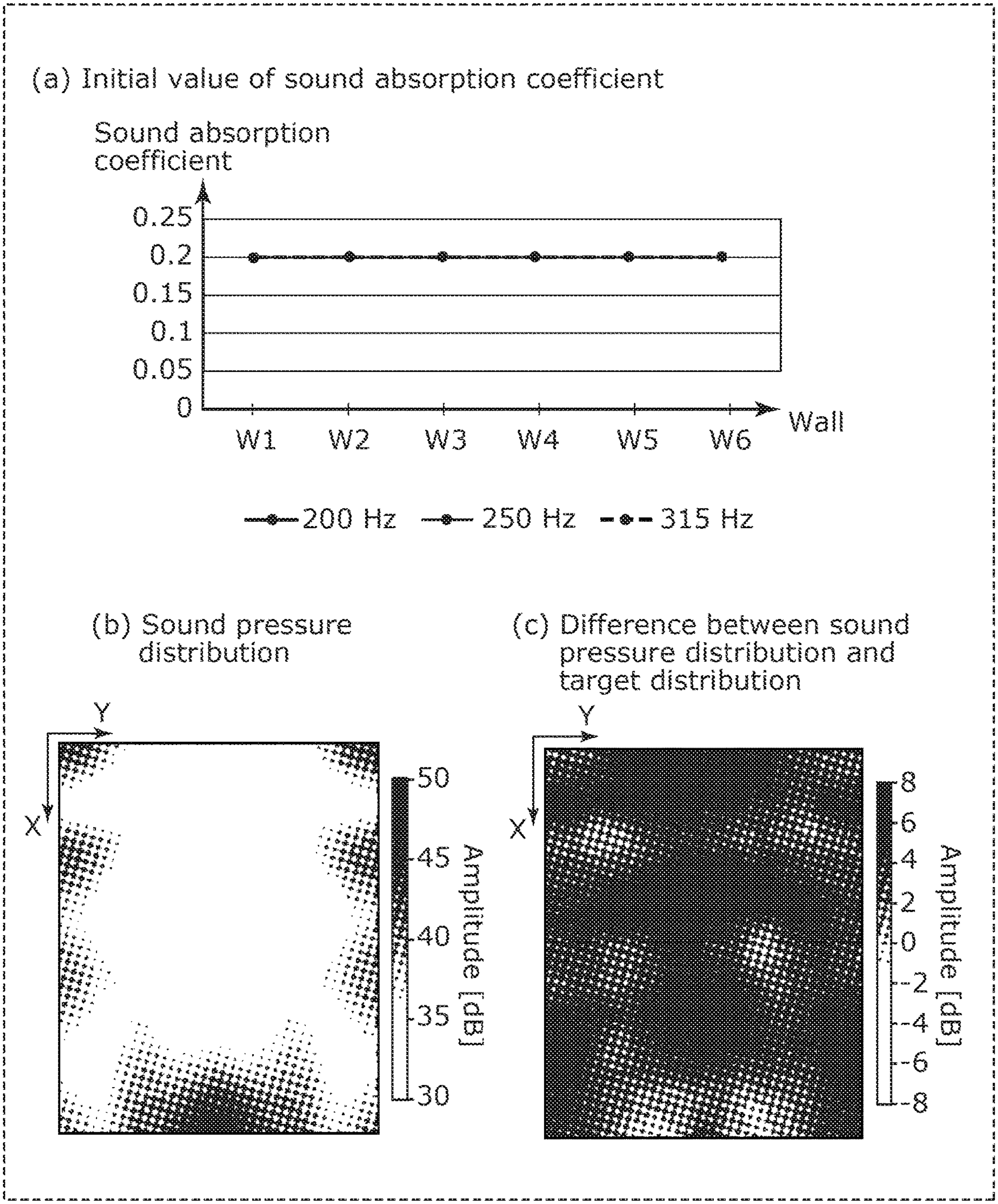
FIG. 7 is an explanatory diagram illustrating an example of an initial value of a sound absorption coefficient, a sound pressure distribution, and the difference between the sound pressure distribution and a target distribution, in the embodiment.

FIG. 7 is an explanatory diagram which (a) illustrates an example of initial values of sound absorption coefficients, (b) illustrates an example of a sound pressure distribution, and (c) illustrates an example of a difference between the sound pressure distribution and a target distribution, in the present embodiment.

As illustrated in (a) of FIG. 7, the initial value of the sound absorption coefficient of respective walls W1 to W6 is 0.2 at frequencies of 200 Hz, 250 Hz, and 315 Hz.

The sound pressure distribution illustrated in (b) of FIG. 7 is a sound pressure distribution that calculator 12 calculated using acoustic simulator 13 using the initial values of the sound absorption coefficients illustrated in (a) of FIG. 7.

In the sound pressure distribution illustrated in (b) of FIG. 7, although the fact that the sound pressure at an outer peripheral part of space S is relatively high and the sound pressure at a central part of space S is relatively low is similar to the target distribution in FIG. 6, the positions where the sound pressure is relatively high and positions where the sound pressure is relatively low differ from the target distribution in FIG. 6. Further, in the sound pressure distribution illustrated in (b) of FIG. 7, the amplitude is low overall compared to the target distribution illustrated in FIG. 6.

The difference illustrated in (c) of FIG. 7 shows the difference between the sound pressure distribution illustrated in (b) of FIG. 7 and the target distribution illustrated in FIG. 6.

Figure 8:
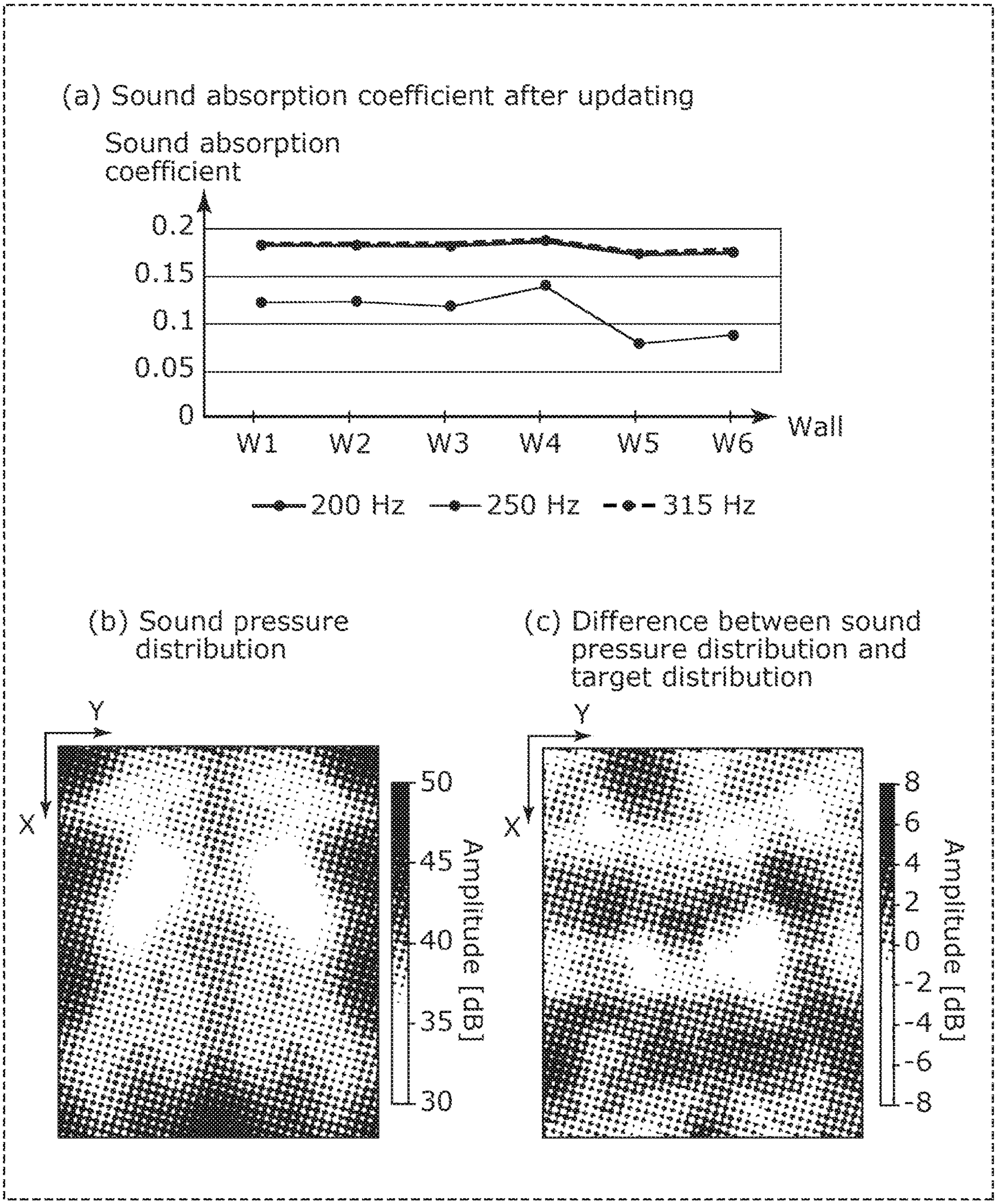
FIG. 8 is an explanatory diagram illustrating an example of a sound absorption coefficient, a sound pressure distribution, and the difference between the sound pressure distribution and a target distribution, after updating in the embodiment.

FIG. 8 is an explanatory diagram which (a) illustrates an example of sound absorption coefficients after updating, (b) illustrates an example of a sound pressure distribution, and (c) illustrates an example of a difference between the sound pressure distribution and a target distribution, in the present embodiment.

The sound absorption coefficient after updating of walls W1 to W6 illustrated in (a) of FIG. 8 is a sound absorption coefficient after updating was performed eight times. The sound absorption coefficients after updating of walls W1 to W6 are approximately 0.18 at frequencies 200 Hz and 315 Hz. Further, at a frequency of 250 Hz, the sound absorption coefficient of walls W1 to W3 is approximately 0.13, the sound absorption coefficient of wall W4 is approximately 0.14, and the sound absorption coefficient of walls W5 and W6 is approximately 0.08.

The sound pressure distribution illustrated in (b) of FIG. 8 is a sound pressure distribution that calculator 12 calculated using acoustic simulator 13 using the sound absorption coefficients after updating illustrated in (a) of FIG. 8.

In the sound pressure distribution illustrated in (b) of FIG. 8, the fact that the sound pressure at an outer peripheral part of space S is relatively high and the sound pressure at a central part of space S is relatively low is similar to the target distribution in FIG. 6. The positions where the sound pressure is relatively high and positions where the sound pressure is relatively low are closer to the target distribution than in the sound pressure distribution illustrated in (b) of FIG. 7. Further, the amplitude in the sound pressure distribution illustrated in (b) of FIG. 8 is approximately the same as the amplitude in the target distribution illustrated in FIG. 6.

The difference illustrated in (c) of FIG. 8 shows the difference between the sound pressure distribution illustrated in (b) of FIG. 8 and the target distribution illustrated in FIG. 6. As illustrated in (c) of FIG. 8, the difference between the sound pressure distribution and the target distribution is closer to 0 than the case illustrated in (c) of FIG. 7.

In this manner, the sound absorption coefficients after updating are brought closer to the target distribution than the initial values of the sound absorption coefficients. In other words, it can be said that as a result of starting from the initial values of the sound absorption coefficients and updating the sound absorption coefficients multiple times so as to bring the sound pressure distribution realized by the sound absorption coefficients close to the target distribution, information processing device 10 succeeded in estimating acoustic parameters that can realize the target distribution or a sound pressure distribution which is relatively close to the target distribution. In this manner, information processing device 10 can estimate acoustic parameters that realize the target distribution.

Note that, in a case where it is assumed that the sound absorption coefficients of two or more walls among a plurality of walls are the same, when updating the sound absorption coefficients as acoustic parameters, the sound absorption coefficients may be updated by setting the same value as the sound absorption coefficients of the above-described two or more walls. By this means, the amount of calculation in the processing for updating the sound absorption coefficients by calculator 12 can be reduced, which can contribute to reducing the processing load of information processing device 10 and to reducing the power consumption.

Note that measurement points for measuring the sound pressure distribution in space S, that is, the positions of microphones that pick up sound propagating in space S, can be estimated from a plurality of images generated by photographing space S using a plurality of cameras.

Figure 9:
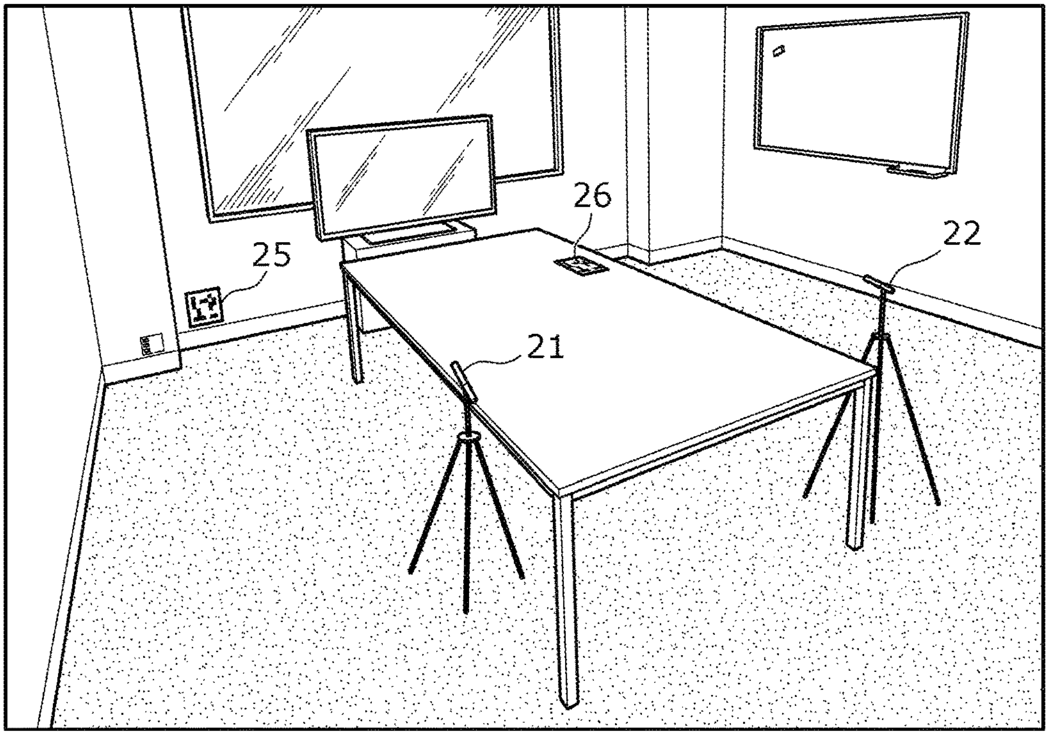
FIG. 9 is an explanatory diagram illustrating an image to be used in obtaining the position of a microphone in a space, in the embodiment.

FIG. 9 is an explanatory diagram illustrating an image to be used for obtaining the positions of microphones in a space in the present embodiment.

The image illustrated in FIG. 9 is an example of an image captured by a camera installed in space S, and shows microphones 21 and 22, a table, and a display device and so on which are arranged in space S. Markers 25 and 26 which are arranged in space S are also shown in the image illustrated in FIG. 9. Markers 25 and 26 are arranged at known positions in space S. Note that, the number of microphones is not limited to two, and may be any number from one upwards. Further, the number of markers is not limited to two, and may be any number from one upwards.

A plurality of cameras installed in space S each generates an image showing microphones 21 and 22 and markers 25 and 26.

Information processing device 10 obtains a plurality of images generated by the above-described cameras, and detects microphones 21 and 22 and markers 25 and 26 in each image by image recognition processing. Further, information processing device 10 estimates the positions of the plurality of cameras by associating the depth information of markers 25 and 26 in the plurality of images.

Information processing device 10 then calculates estimated values of the three-dimensional positions of microphones 21 and 22 in space S (also referred to as "estimated positions") based on the estimated positions of the plurality of cameras and the positions of microphones 21 and 22 in the images. Note that, the plurality of cameras installed in space S may be included in information processing device 10, or need not be included in information processing device 10.

Figure 10:
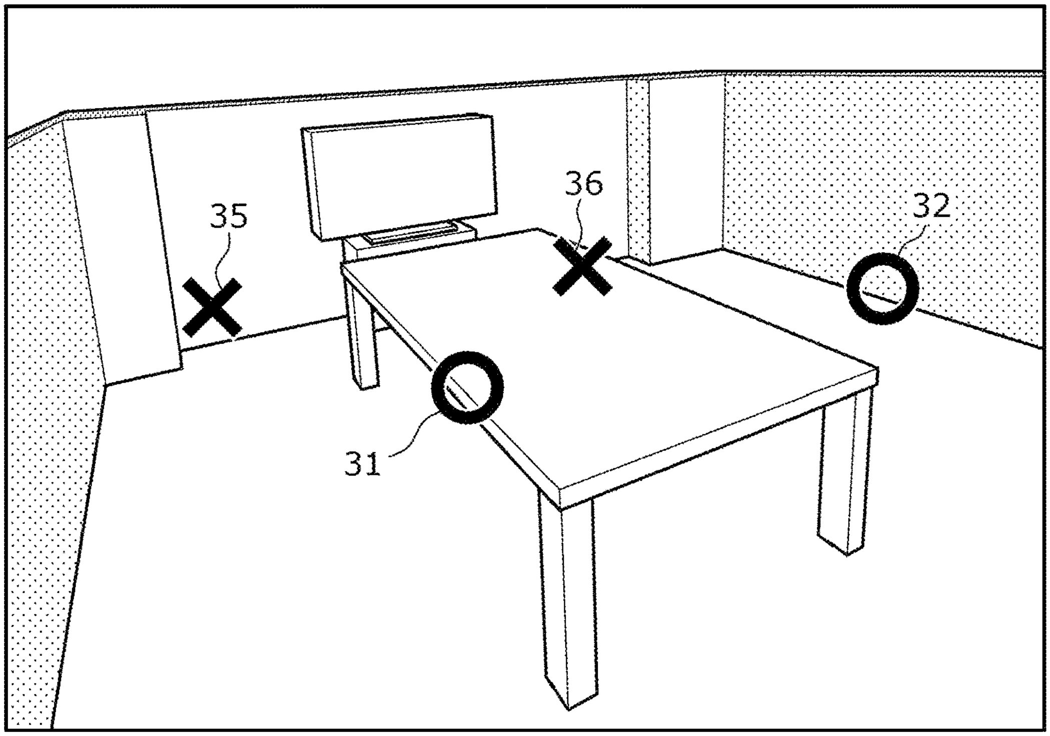
FIG. 10 is an explanatory diagram indicating an estimated position of a microphone in a space, in the embodiment.

Estimated positions 31 and 32 of microphones 21 and 22 calculated by information processing device 10 as well as positions 35 and 36 of markers 25 and 26 in space S are shown in FIG. 10.

In this manner, information processing device 10 can obtain estimated positions of microphones 21 and 22 in space S using a plurality of cameras and markers.

Note that, in the above description, an example of use is described in which, in a case where acoustic parameters that an existing space has are unknown, information processing device 10 is used for the purpose of estimating the acoustic parameters that the space has based on a sound pressure distribution that was actually measured in the space. As another example of use, in a case where there is a desired sound pressure distribution for a space which does not exist and which is a space that will be realized in the future, it is possible for information processing device 10 to also be used for the purpose of determining parameter values that realize the space having the desired sound pressure distribution.

In this case, it suffices to perform the same processing as the above-described processing, using the above-described desired sound pressure distribution in the above-described space as the target distribution. In this manner, based on a desired sound pressure distribution to be realized in the future in a space which does not yet exist, information processing device 10 can determine parameter values for realizing the sound pressure distribution, and can thus contribute to the realization of the aforementioned space having the aforementioned sound pressure distribution. For example, information processing device 10 can contribute to determining the layout or materials of walls for realizing a desired sound pressure distribution in a building which it is planned to construct.

Variation of Embodiment

In the present variation, another example is described with respect to an information processing method, an information processing device, and so on which can appropriately determine acoustic parameters.

Information processing device 10 of the present variation is used for designing a sound reproduction system having directivity. As one example, in the case of a sound pressure distribution which does not yet exist and which is a sound pressure distribution that it is desired to realize in the future, information processing device 10 of the present variation is used for the purpose of determining some acoustic parameters that will realize the desired sound pressure distribution. The above-described some acoustic parameters are the loudspeaker characteristics, and specifically include the amplitude and phase of sound that the loudspeaker outputs.

In this case, it is assumed that acoustic parameters (specifically, sound absorption coefficients of walls that make up the space, the shape of the space, the position of a loudspeaker, and so on) other than the above-described some acoustic parameters, that is, the loudspeaker characteristics, among the acoustic parameters which the space has are already determined and are not changed.

Figure 11:
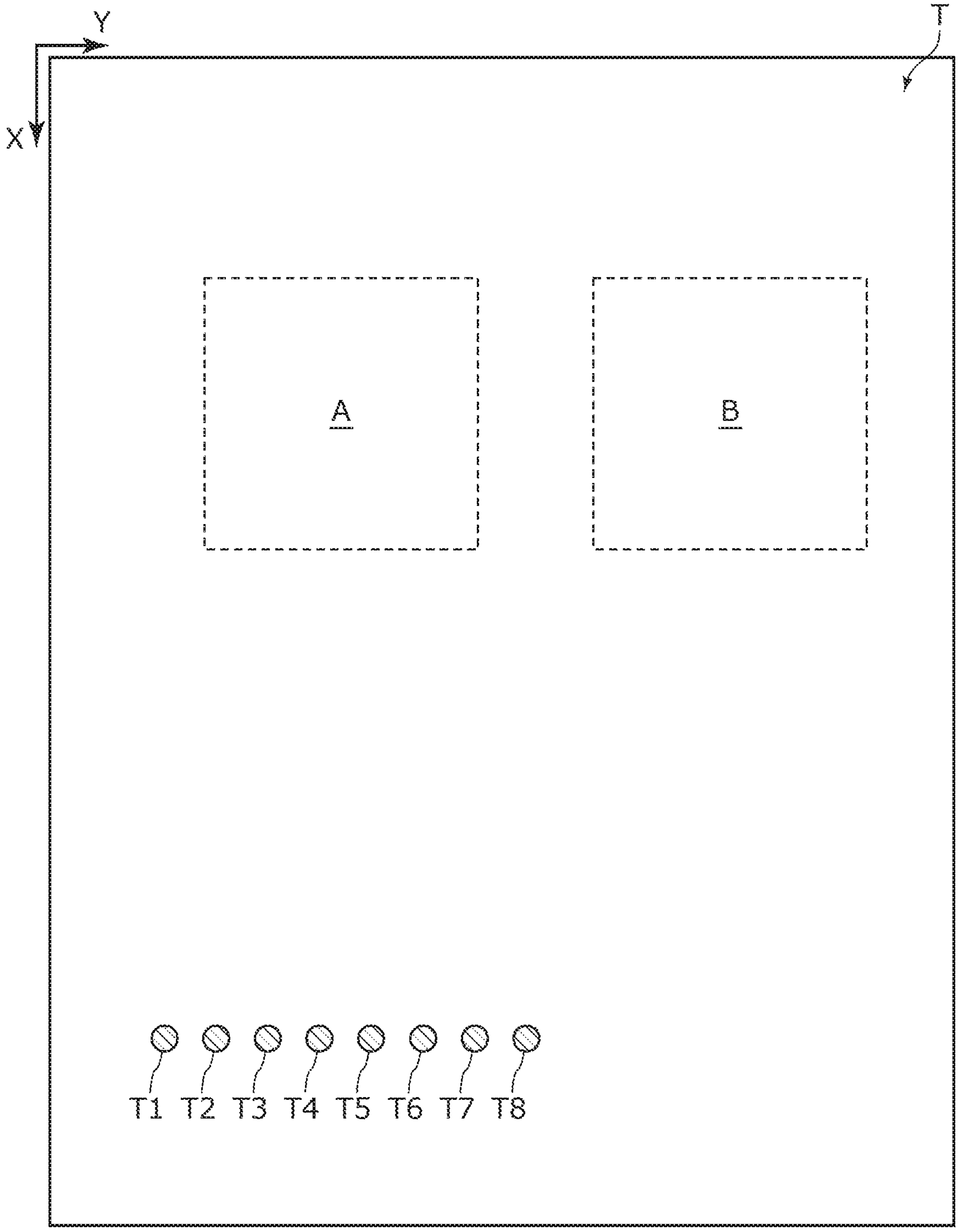
FIG. 11 is a schematic diagram illustrating a space for which the amplitude and the phase of a loudspeaker are to be determined, in a variation of the embodiment.

FIG. 11 is a schematic diagram illustrating space T for which the amplitudes and phases of loudspeakers are to be determined, in a variation of the embodiment. A plan view of space T is illustrated in FIG. 11.

As illustrated in FIG. 11, a loudspeaker array is arranged in space T. The loudspeaker array has loudspeakers T1, T2, T3, T4, T5, T6, T7, and T8 (also referred to as "T1 to T8") which are arranged side by side in the Y-axis direction. Note that, the number, positions, and so on of loudspeakers included in the loudspeaker array are not limited to those described above, and a different number of loudspeakers and different positions may be used.

Further, region A and region B are set in space T. As one example of a sound reproduction system having directivity, information processing device 10 determines the amplitudes and phases of the loudspeakers so as to maximize the sound pressure difference between region A and region B.

The functional parts which information processing device 10 includes in the present variation are the same as the functional parts of information processing device 10 in the above-described embodiment (see FIG. 2).

Obtainer 11 obtains parameter values that are the values of acoustic parameters in space T. Further, by executing acoustic simulation using the obtained parameter values, obtainer 11 obtains a sound pressure distribution (also referred to as "first sound pressure distribution") in region A (also referred to as "first region") in space T, and a sound pressure distribution (also referred to as "second sound pressure distribution") in region B (also referred to as "second region") in space T.

Calculator 12 updates the parameter values so as to maximize the difference between the first sound pressure distribution and the second sound pressure distribution that are obtained.

Outputter 14 outputs the updated parameter values.

Figure 12:
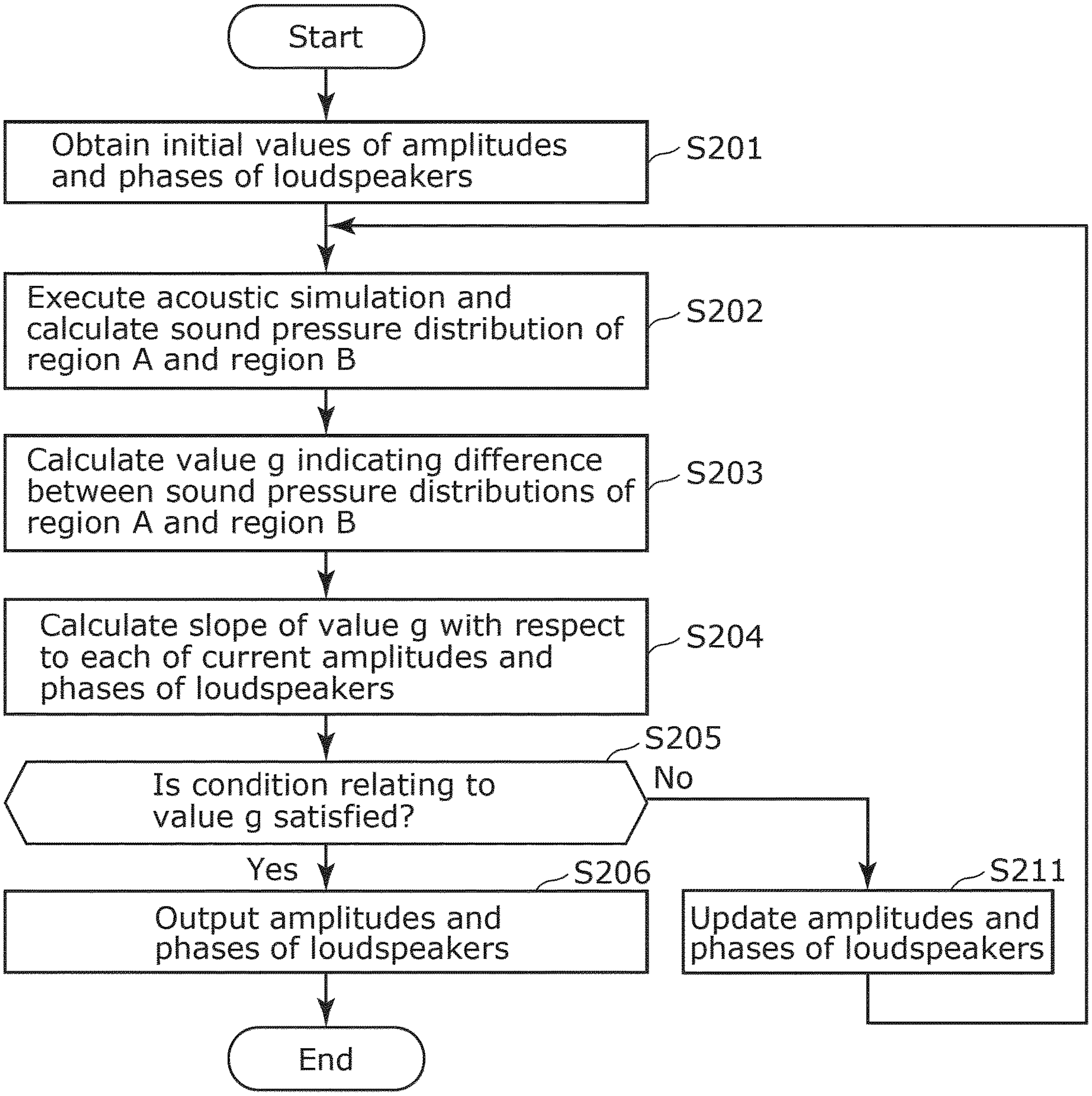
FIG. 12 is a flowchart illustrating an information processing method in the variation of the embodiment.

FIG. 12 is a flowchart illustrating the information processing method in the present variation.

As illustrated in FIG. 12, in step S201, obtainer 11 obtains the initial values of the amplitudes and phases of the loudspeakers. The manner in which the initial values are obtained is the same as in the processing (step S102) for obtaining the initial value of a sound absorption coefficient in the above-described embodiment.

In step S202, by executing acoustic simulation, calculator 12 calculates a sound pressure distribution of region A and a sound pressure distribution of region B. Specifically, by executing acoustic simulation using the amplitudes and positions of the loudspeakers obtained in step S201, calculator 12 calculates a sound pressure distribution of region A and a sound pressure distribution of region B when loudspeakers T1 to T8 output sound.

In step S203, calculator 12 calculates difference value g between the sound pressure distribution of region A and the sound pressure distribution of region B calculated in step S202. Difference value g is represented by a mathematical expression that has a larger value as the difference between the sound pressure distribution of region A and the sound pressure distribution of region B calculated in step S201 increases. As one example, difference value g can be represented by a root-mean-square error, similarly to difference value f in the above-described embodiment (see (Equation 1)).

In step S204, calculator 12 calculates the slope of value g with respect to the current amplitudes and phases of the loudspeakers. The manner of calculating the slope of difference value g is the same as in the processing for obtaining a slope of the sound absorption coefficient in the above-described embodiment (step S105).

In step S205, calculator 12 determines whether or not a predetermined condition relating to difference value g is satisfied. If calculator 12 determines that the predetermined condition is satisfied (Yes in step S205), the process proceeds to step S206, otherwise (No in step S205) the process proceeds to step S211. The predetermined condition is a condition which is prescribed in advance as a condition indicating that, with respect to the new first sound pressure distribution and the new second sound pressure distribution that were obtained by executing the acoustic simulation, the difference between the first sound pressure distribution and the second sound pressure distribution increased.

More specifically, the predetermined condition is that at least one of the following is satisfied: (a) that a slope, in a vicinity of the new first sound pressure distribution or the new second sound pressure distribution, of a function indicating the difference between the new first sound pressure distribution and the new second sound pressure distribution is smaller than a specified value; (b) that the difference between the new first sound pressure distribution and the new second sound pressure distribution is bigger than or equal to a specified value; and (c) that a total number of executions of the acoustic simulation is greater than or equal to a specified value.

Here, the specified value in the above-described (a) can be set to, for example, 10% of the slope calculated in step S204 when step S204 was initially executed. The specified value in the above-described (b) can be set to, for example, 15 dB or more. The specified value relating to the total number of executions in the above-described (c) can be set to, for example, 10 to 100 times.

In step S211, calculator 12 updates the amplitudes and phases of the loudspeakers. The manner of updating the amplitudes and phases of the loudspeakers is the same as in the processing (step S111) for updating the sound absorption coefficient in the above-described embodiment.

In step S206, outputter 14 outputs the amplitudes and phases of the loudspeakers. The amplitudes and phases of the loudspeakers that are outputted are the amplitudes and phases of the loudspeakers which were obtained in step S211 by updating the amplitudes and phases of the loudspeakers obtained in step S201. Note that, if it is determined that the condition relating to value g is satisfied (Yes in step S205) when step S205 is executed for the first time, the amplitudes and phases of the loudspeakers obtained in step S201 are outputted as they are.

By performing the series of processing described above, acoustic parameters can be appropriately determined. More specifically, the amplitudes and phases of the loudspeakers can be determined so as to maximize the sound pressure difference between region A and region B.

As described above, in the information processing method according to the above-described embodiment and the above-described variation, since a parameter value is updated to bring a sound pressure distribution obtained by acoustic simulation close to a target distribution, it is possible to output an appropriate acoustic parameter that can realize the target distribution or a sound pressure distribution that is relatively close to the target distribution. In this manner, the information processing method according to an aspect of the present disclosure can determine an appropriate acoustic parameter.

Furthermore, since a parameter value is outputted when a new sound pressure distribution obtained by executing acoustic simulation has been brought close to a target distribution, it is guaranteed that the outputted parameter value is a parameter value such that a sound pressure distribution obtained by acoustic simulation using the parameter value is relatively close to the target distribution. In other words it can be said that the outputted parameter value is a parameter value that can realize the target distribution or a sound pressure distribution which is relatively close to the target distribution. Hence, the information processing method according to one aspect of the present disclosure can more appropriately determine an acoustic parameter.

Furthermore, whether a new sound pressure distribution obtained by executing acoustic simulation is relatively close to a target distribution is determined using a specific condition. Hence, the information processing method according to one aspect of the present disclosure can more easily and more appropriately determine an acoustic parameter.

Furthermore, since the difference between a sound pressure distribution obtained by executing acoustic simulation and a target distribution is obtained using a root-mean-square error, it becomes easier to determine an acoustic parameter. Hence, the information processing method according to one aspect of the present disclosure can more easily and more appropriately determine an acoustic parameter.

Furthermore, since updating of a parameter value is performed using the steepest descent method, the Newton method, or Bayesian optimization, it becomes easier to update a parameter value. Hence, the information processing method according to one aspect of the present disclosure can more easily and more appropriately determine an acoustic parameter.

Furthermore, since acoustic simulation is performed using a finite element method, sound ray-tracing method, or image source method, it becomes easier to execute acoustic simulation. Hence, the information processing method according to one aspect of the present disclosure can more easily and more appropriately determine an acoustic parameter.

Furthermore, a sound absorption coefficient of a wall that makes up a space, a shape of the space, a position of a loudspeaker disposed inside the space, an amplitude or a phase of a sound outputted by a loudspeaker disposed inside the space, or a position of an object disposed inside the space can be appropriately determined as an acoustic parameter.

Furthermore, since the same sound absorption coefficient is set for two or more walls among a plurality of walls that make up the space, the amount of calculation in the processing for updating the sound absorption coefficients can be reduced, which can reduce the processing load and contribute to reducing the power consumption. Hence, the information processing method according to one aspect of the present disclosure can appropriately determine an acoustic parameter while contributing to power saving.

According to the above-described aspect, by using a sound pressure distribution that is actually measured in the space as the target distribution, an acoustic parameter realizing the space can be determined and outputted. Hence, the information processing method according to one aspect of the present disclosure can appropriately determine an acoustic parameter realizing a space that actually exists.

Furthermore, by using a sound pressure distribution that is actually measured in a space for which a parameter value is unknown as the target distribution, the parameter value in the space can be determined and outputted. Hence, the information processing method according to one aspect of the present disclosure can appropriately determine an acoustic parameter realizing a space that actually exists.

Furthermore, since a parameter value is updated so as to increase a difference between sound pressure distributions in two regions obtained by executing acoustic simulation, an appropriate acoustic parameter which can realize the above-described two regions having a relatively large difference between the respective sound pressure distributions thereof can be determined and outputted. In this manner, the information processing method according to one aspect of the present disclosure can appropriately determine an acoustic parameter.

Furthermore, since a parameter value is outputted when a difference between a new first sound pressure distribution and a new second sound pressure distribution obtained by executing acoustic simulation is relatively large, it is guaranteed that the outputted parameter value is a parameter value such that a difference between a first sound pressure distribution and a second sound pressure distribution that are obtained by acoustic simulation using the parameter value is relatively large. In other words, it can be said that the outputted parameter value is a parameter value that can realize a first sound pressure distribution and a second sound pressure distribution which have a relatively large difference therebetween. Hence, the information processing method according to one aspect of the present disclosure can more appropriately determine an acoustic parameter.

Furthermore, whether a difference between a new first sound pressure distribution and a new second sound pressure distribution that are obtained by executing acoustic simulation is relatively large is determined using a specific condition. Hence, the information processing method according to one aspect of the present disclosure can more easily and more appropriately determine an acoustic parameter.

It should be noted that, in the above-described embodiment and the above-described variation, the respective structural components may be implemented as dedicated hardware or may be realized by executing a software program suited to such structural component. Alternatively, the respective structural components may be implemented by a program executor such as a CPU or a processor reading out and executing the software program recorded in a recording medium such as a hard disk or a semiconductor memory. Here, the software for realizing the information processing method, and so on, in the above-described embodiment and the above-described variation is a program such as that described below.

Specifically, the program is a program for causing a computer to execute an information processing method including: obtaining a target distribution indicating a target for sound pressure distribution in a space; obtaining an initial value of a parameter value, the parameter value being a value of an acoustic parameter of the space; executing acoustic simulation using the initial value as the parameter value, to obtain the sound pressure distribution in the space; updating the parameter value to bring the sound pressure distribution obtained closer to the target distribution; and outputting the parameter value updated.

Although an information processing method, and so on, according to one or more aspects has been described based on exemplary embodiments, the present disclosure is not limited to such embodiments. The one or more aspects may thus include forms obtained by making various modifications to the above embodiments that can be conceived by those skilled in the art, as well as forms obtained by combining structural components in different embodiments, without materially departing from the essence of the present disclosure.

INDUSTRIAL APPLICABILITY

The present disclosure is usable as an information processing device that can appropriately determine acoustic parameters.

The invention claimed is:

1. An information processing method comprising:

obtaining a target distribution indicating a target for sound pressure distribution in a space;

obtaining an initial value of a parameter value, the parameter value being a value of an acoustic parameter of the space;

executing acoustic simulation using the initial value as the parameter value, to obtain the sound pressure distribution in the space;

updating the parameter value to bring the sound pressure distribution obtained closer to the target distribution; and outputting the parameter value updated, wherein the updating of the parameter value includes:

executing the acoustic simulation using the parameter value updated, to obtain a new sound pressure distribution in the space; and determining whether the new sound pressure distribution obtained satisfies a predetermined condition indicating whether the sound pressure distribution has gotten closer to the target distribution compared to a first sound pressure distribution obtained before the updating of the parameter value, and in the outputting of the parameter value updated, the parameter value updated is outputted when it is determined that the new sound pressure distribution satisfies the predetermined condition.

2. The information processing method according to claim 1, wherein in the updating of the parameter value, satisfaction of at least one of the following is used as the predetermined condition:

(a) that a value of a function indicating a difference between the new sound pressure distribution and the target distribution, for the parameter value, is smaller than a specified value;

(b) that a slope, in a vicinity of the parameter value, of the function indicating a difference between the new sound pressure distribution and the target distribution is smaller than a specified value;

(c) that an average of absolute values of differences of respective variables of the new sound pressure distribution and the target distribution is smaller than or equal to a specified value, and differences between the respective variables fall within a specified range; and (d) a total number of executions of the acoustic simulation is greater than or equal to a specified value.

3. The information processing method according to claim 2, wherein the difference between the new sound pressure distribution and the target distribution is a root-mean-square error between the sound pressure distribution and the target distribution.

4. The information processing method according to claim 1, wherein in the updating of the parameter value, the parameter value is updated by using steepest descent method, Newton method, or Bayesian optimization.

5. The information processing method according to claim 1, wherein the acoustic simulation is implemented according to finite element method, sound ray-tracing method, or image source method.

6. The information processing method according to claim 1, wherein the acoustic parameter includes: a sound absorption coefficient of a wall that makes up the space, a shape of the space, a position of a loudspeaker disposed inside the space, an amplitude or phase of a sound outputted by a loudspeaker disposed in the space, or a position of an object disposed inside the space.

7. The information processing method according to claim 1, wherein the acoustic parameter is a sound absorption coefficient of a plurality of walls that make up the space, and in the updating of the parameter value, the parameter value is updated by setting a same value as a sound absorption coefficient of two or more of the plurality of walls.

8. The information processing method according to claim 1, wherein the target distribution is a sound pressure distribution actually measured in the space.

9. The information processing method according to claim 1, wherein the target distribution is a desired sound pressure distribution for the space.

10. A non-transitory computer-readable recording medium having recorded thereon a program for causing a computer to execute the information processing method according to claim 1.

11. An information processing method comprising:

obtaining a parameter value that is a value of an acoustic parameter of a space;

executing acoustic simulation using the parameter value, to obtain a first sound pressure distribution inside a first region in the space and a second sound pressure distribution inside a second region in the space;

updating the parameter value to increase a difference between the first sound pressure distribution and the second sound pressure distribution; and outputting the parameter value updated, wherein the updating of the parameter value includes:

executing the acoustic simulation using the parameter value updated, to obtain a new first sound pressure distribution and a new second sound pressure distribution in the space; and determining whether the new first sound pressure distribution and the new second sound pressure distribution obtained satisfy a predetermined condition indicating whether the difference between the first sound pressure distribution and the second sound pressure distribution has gotten closer to the target distribution compared to a first sound pressure distribution and a second sound pressure distribution obtained before the updating of the parameter value, and in the outputting of the parameter value updated, the parameter value updated is outputted when it is determined that the new first sound pressure distribution and the new second sound pressure distribution satisfy the predetermined condition.

12. The information processing method according to claim 11, wherein in the updating of the parameter value, satisfaction of at least one of the following is used as the predetermined condition:

(a) that a slope, in a vicinity of the parameter value, of a function indicating the difference between the new first sound pressure distribution and the new second sound pressure distribution is smaller than a specified value;

(b) that the difference between the new first sound pressure distribution and the new second sound pressure distribution is bigger than or equal to a specified value; and (c) a total number of executions of the acoustic simulation is greater than or equal to a specified value.

13. A non-transitory computer-readable recording medium having recorded thereon a program for causing a computer to execute the information processing method according to claim 11.

14. An information processing device comprising:

an obtainer;

a calculator; and an outputter, wherein the obtainer obtains a target distribution indicating a target for sound pressure distribution in a space, and obtains an initial value of a parameter value, the parameter value being a value of an acoustic parameter of the space, the calculator executes acoustic simulation using the initial value as the parameter value, to obtain the sound pressure distribution in the space, and updates the parameter value to bring the sound pressure distribution obtained closer to the target distribution, and the outputter outputs the parameter value updated, wherein the updating of the parameter value includes:

executing the acoustic simulation using the parameter value updated, to obtain a new sound pressure distribution in the space; and determining whether the new sound pressure distribution obtained satisfies a predetermined condition indicating whether the sound pressure distribution has gotten closer to the target distribution compared to a first sound pressure distribution obtained before the updating of the parameter value, and in the outputting of the parameter value updated, the parameter value updated is outputted when it is determined that the new sound pressure distribution satisfies the predetermined condition.

15. An information processing device comprising:

an obtainer;

a calculator; and an outputter, wherein the obtainer obtains a parameter value that is a value of an acoustic parameter of a space, the calculator executes acoustic simulation using the parameter value, to obtain a first sound pressure distribution inside a first region in the space and a second sound pressure distribution inside a second region in the space, and updates the parameter value to increase a difference between the first sound pressure distribution and the second sound pressure distribution, and the outputter outputs the parameter value updated, wherein the updating of the parameter value includes:

executing the acoustic simulation using the parameter value updated, to obtain a new first sound pressure distribution and a new second sound pressure distribution in the space; and determining whether the new first sound pressure distribution and the new second sound pressure distribution obtained satisfy a predetermined condition indicating whether the difference between the first sound pressure distribution and the second sound pressure distribution has gotten closer to the target distribution compared to a first sound pressure distribution and a second sound pressure distribution obtained before the updating of the parameter value, and in the outputting of the parameter value updated, the parameter value updated is outputted when it is determined that the new first sound pressure distribution and the new second sound pressure distribution satisfy the predetermined condition.

* * * * *